(Model.)

F. BROUGH.
HANDLE ATTACHMENT.

No. 378,540. Patented Feb. 28, 1888.

Witnesses.
E. E. Sickler.
F. A. Jacob.

Inventor.
Frank Brough.

UNITED STATES PATENT OFFICE.

FRANK BROUGH, OF INDIANAPOLIS, INDIANA.

HANDLE ATTACHMENT.

SPECIFICATION forming part of Letters Patent No. 378,540, dated February 28, 1888.

Application filed April 2, 1887. Serial No. 233,458. (Model.)

*To all whom it may concern:*

Be it known that I, FRANK BROUGH, a citizen of the United States, residing at Indianapolis, in the county of Marion and State of Indiana, have invented a new and useful Improvement in Handle Attachments, of which the following is a specification.

The object of my invention is to provide a simple, inexpensive, and convenient means by which an ordinary broom or other handle may be lengthened when necessary, as when sweeping a high ceiling or cleaning a high window. I attain this object by means of the device shown in the accompanying drawings, in which—

Figure 1:
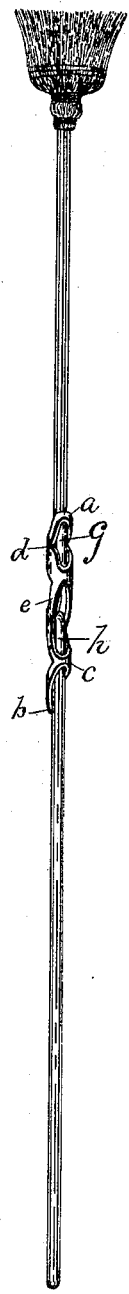
Figure 2:
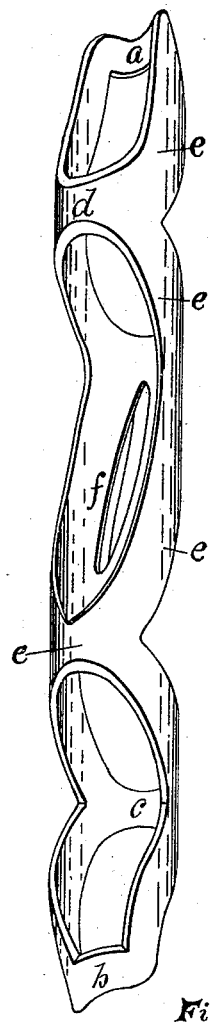

Figure 1 is a view of an ordinary broom the handle of which has been lengthened by my device. Fig. 2 is a perspective view of my device, nearly full size.

My device consists of a hollow cylinder whose bore is a little larger than the ordinary broom-handle, portions of which are cut away, leaving only certain parts which are to bear on the handles and a body joining these parts. These parts are represented by the letters $a$, $b$, $c$, and $d$, and the body by $e$. The tube is divided into two portions by a partition, $f$, placed diagonally across the middle of its axis, the sides of said partition presenting an inclined surface toward either extremity of the tube. A socket is thus formed by the points $a$ and $d$ and the incline $f$, into which the handle of the broom may be inserted, as shown at $g$ in Fig. 1. A similar socket is formed in the opposite end by points $c$ and $b$, and the opposite side of the partition $f$, into which an auxiliary handle, $h$, is inserted, as shown. Now by striking a slight blow upon the outer end of one of the handles the two sections are settled together into the sockets and a perfectly rigid handle is secured. When it is desired to shorten the handle, a slight blow upon the end of the attachment will loosen it, and it may be removed without marring in any manner the original handle.

It is not necessary that the handles be of uniform size and shape, as the incline will cramp any handle of ordinary size.

It is understood that the device may be readily applied to the sections of a folding tripod and many other similar purposes.

I am aware that devices clamping upon the two sections of a handle by means of thumb-screws have been in use heretofore, but I am not aware that inclines adapted to holding sections of handles of different sizes have ever been used.

I claim as my invention and desire to secure by Letters Patent—

As an improvement in devices for extending the handles of brooms and similar implements, the perforated hollow cylinder open at both ends and provided with an inclined partition, as shown and described, said cylinder being adapted to receive the ends of a handle and its extension, as set forth.

FRANK BROUGH.

Witnesses:
E. E. SICKLER,
F. A. JACOB.